United States Patent
Nagle et al.

(10) Patent No.: US 7,690,393 B2
(45) Date of Patent: Apr. 6, 2010

(54) IRRIGATION SYSTEM EXTERNAL WATER SUPPLY SHUTOFF

(75) Inventors: Allen J. Nagle, Woodbury, MN (US); Paul Michael Holmes, Blaine, MN (US); Jonathan Salvatore Kallestad, Ham Lake, MN (US)

(73) Assignee: Flow-Tech Industries, Inc., Anoka, MN (US)

( * ) Notice: Subject to any disclaimer, the term of this patent is extended or adjusted under 35 U.S.C. 154(b) by 1150 days.

(21) Appl. No.: 11/082,682

(22) Filed: Mar. 17, 2005

(65) Prior Publication Data

US 2005/0205132 A1    Sep. 22, 2005

Related U.S. Application Data

(60) Provisional application No. 60/554,727, filed on Mar. 19, 2004.

(51) Int. Cl.
  *F16K 11/10* (2006.01)
(52) U.S. Cl. .................................. 137/357; 137/870
(58) Field of Classification Search .................. 137/337, 137/338, 862, 870, 115.13, 115.16, 460, 137/456; 251/129.04
  See application file for complete search history.

(56) References Cited

U.S. PATENT DOCUMENTS

| | | | | |
|---|---|---|---|---|
| 3,369,556 A * | 2/1968 | Allderdice | | 137/62 |
| 4,848,389 A * | 7/1989 | Pirkle | | 137/80 |
| 5,082,018 A * | 1/1992 | Caswell et al. | | 137/357 |
| 5,287,876 A * | 2/1994 | Takahashi | | 137/62 |
| 5,584,665 A * | 12/1996 | Walsh et al. | | 417/29 |
| 5,638,847 A * | 6/1997 | Hoch et al. | | 137/80 |
| 5,678,596 A * | 10/1997 | Corallo | | 137/357 |
| 5,813,655 A * | 9/1998 | Pinchott et al. | | 251/129.04 |
| 6,337,635 B1 * | 1/2002 | Ericksen et al. | | 340/825.69 |
| 6,422,319 B2 * | 7/2002 | Haase, III | | 137/357 |
| 6,491,062 B1 * | 12/2002 | Croft | | 137/624.11 |
| 6,662,821 B2 * | 12/2003 | Jacobsen et al. | | 137/312 |
| 2004/0107994 A1 * | 6/2004 | Bartek | | 137/357 |

OTHER PUBLICATIONS

"Watts: Through the Wall Water Supply Shutoffs", [online]. © 2008 Watts Water Technologies, Inc. [retrieved Feb. 25, 2008]. Retrieved from the Internet: <URL: http://www.watts.com/pro/_productsFull.asp?pid=735&ref=1>, 2 pgs.

* cited by examiner

*Primary Examiner*—John Fox
(74) *Attorney, Agent, or Firm*—Schwegman, Lundberg & Woesser, P.A.

(57) ABSTRACT

The present subject matter relates to controlling water sources external to a structure and more particularly to an external water shutoff. One embodiment of the present subject matter includes an apparatus having an electrically operable valve placed on a water supply line internal to a structure between a location where the water supply line enters the structure and a location where the water supply line exits the structure, an auto-drain valve, and means for controlling the electrically operable valve, wherein the means for controlling is external to the structure, further wherein the means for controlling the electrically operable valve is communicatively connected to the electrically operable valve external to the structure.

6 Claims, 12 Drawing Sheets

IRRIGATION SYSTEM EXTERNAL WATER SUPPLY SHUTOFF

RELATED APPLICATION

This application claims the benefit under 35 U.S.C. 119(e) of U.S. Provisional Application No. 60/554,727 filed Mar. 19, 2004, titled "AUTO-DRAINING EXTERNAL WATER SHUTOFF" which is hereby incorporated by reference.

FIELD

The present subject matter relates to controlling water sources external to a structure and more particularly to an external water shutoff.

BACKGROUND

For various purposes, such as irrigation system maintenance, water sources that extend to the exterior of structures need to be turned off. Prior to irrigation system maintenance, such as winterizing and system startup, the water to the irrigation system needs to be turned off or on from the inside of the structure. If access to the internal controls of the water source is not available, the maintenance cannot be performed. This poses a problem not only for maintenance personnel, but also those controlling access to the structure. An example of this problem is when a busy homeowner is unable to be home to allow maintenance personnel access to control the external water source. The homeowner will be unable to have the maintenance performed without compromising security of the home by leaving a door unlocked.

Further, in various areas, water use restrictions are becoming more and more common place to help conserve water. However, the various governmental bodies tasked with enforcing the watering restrictions are often under-staffed and under-funded. Further, even if proper staff levels and funding are present, sending an enforcement official out into various neighborhoods is generally an inefficient use of resources and in many cases is ineffective. Complete compliance with the water restrictions is virtually impossible.

SUMMARY

The subject matter herein provides various embodiments that are useful to shut off and turn on a water supply external to a structure such as a single or multi-family residence, a building, or other structure. Some embodiments are useful to irrigation system servicers when performing system maintenance such as winterization, system startup, or other maintenance requiring that the water source for the irrigation system be turned on or off. This allows an irrigation system servicer to perform necessary maintenance on an irrigation system without needing to gain access to water control valves located inside the residence or other structure. These embodiments, and others, are described herein.

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
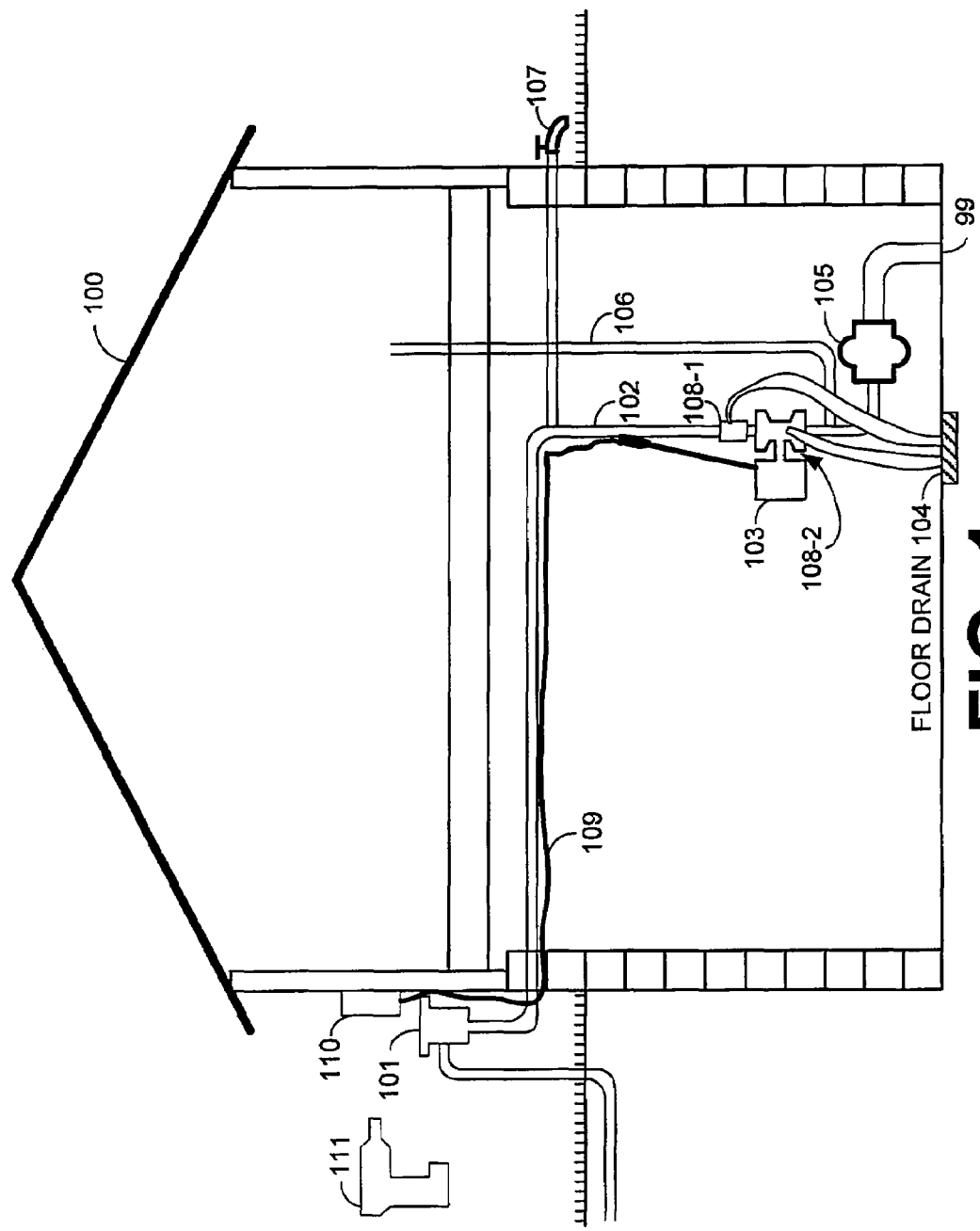
FIG. 1 shows a schematic diagram according to an embodiment of the present subject matter.

FIG. 1 shows an apparatus according to one embodiment of the present subject matter. This embodiment includes a structure 100 having a water supply line 99 entering the structure 100 and shortly thereafter having a water meter 105 for measuring water usage. Water entering the structure is then split, with one portion of the water directed for use as an indoor water supply 106 and the other portion of the water directed for use as an outdoor water supply 102. This embodiment further includes, on the outdoor water supply 102, an electrically operable valve 103, an auto-drain valve 108, and means for controlling 110 the electrically operable valve 103. The outdoor water supply then continues outside for use for various purposes such as an outdoor water faucet 107 or an irrigation system 101.

In various embodiments, the means for controlling 110 is external to the structure 100 and is capable of communicating control signals to the electrically operable valve 103. As illustrated in FIG. 1, the means for controlling 110 is a control box external to the structure 100 communicatively coupled to the electrically operable valve 103 using a wire 109. In some embodiments, the wire 109 is a category 5, multi-wire cable. In some such embodiments, the means for controlling 110 is a power service receiver for receiving an electrical charge to operate the electrically controlled valve 103 from a portable control unit 111. In some such embodiments, the portable control unit 111 includes a battery and a connector for coupling the portable control unit to the means for controlling 110.

The electrically operable valve 103 can be any valve that is electrically controlled for the valve 103 to open and close. In some embodiments, the electrically operable valve is a ball valve having an electric motor attached thereto for rotating the ball to open and close the valve.

The auto-drain valve can be virtually any type of valve that allows water to drain from the outdoor water supply 102 between the electrically operable valve 103 and the external water sources such as the outdoor water faucet 107 or the irrigation system 101. In some embodiments, the auto-drain valve is a pressure biased auto-drain valve. In other embodiments, the auto-drain valve is also an electrically operable valve that opens and closes in relation to the electrically operable valve 103. In some embodiments, the auto-drain valve 108-2 is integrated as part of the electrically operable valve 103. In other embodiments, the auto-drain valve 108-1 connects to the outdoor water supply 102 separately from the electrically operable valve 103. In some embodiments, the auto-drain valve is placed on the water supply line at a location best suited for draining the outdoor water supply 102. Some embodiments also include a drain line for directing water from the auto-drain valve to a drain 104 such as floor drain 104.

Figure 2:
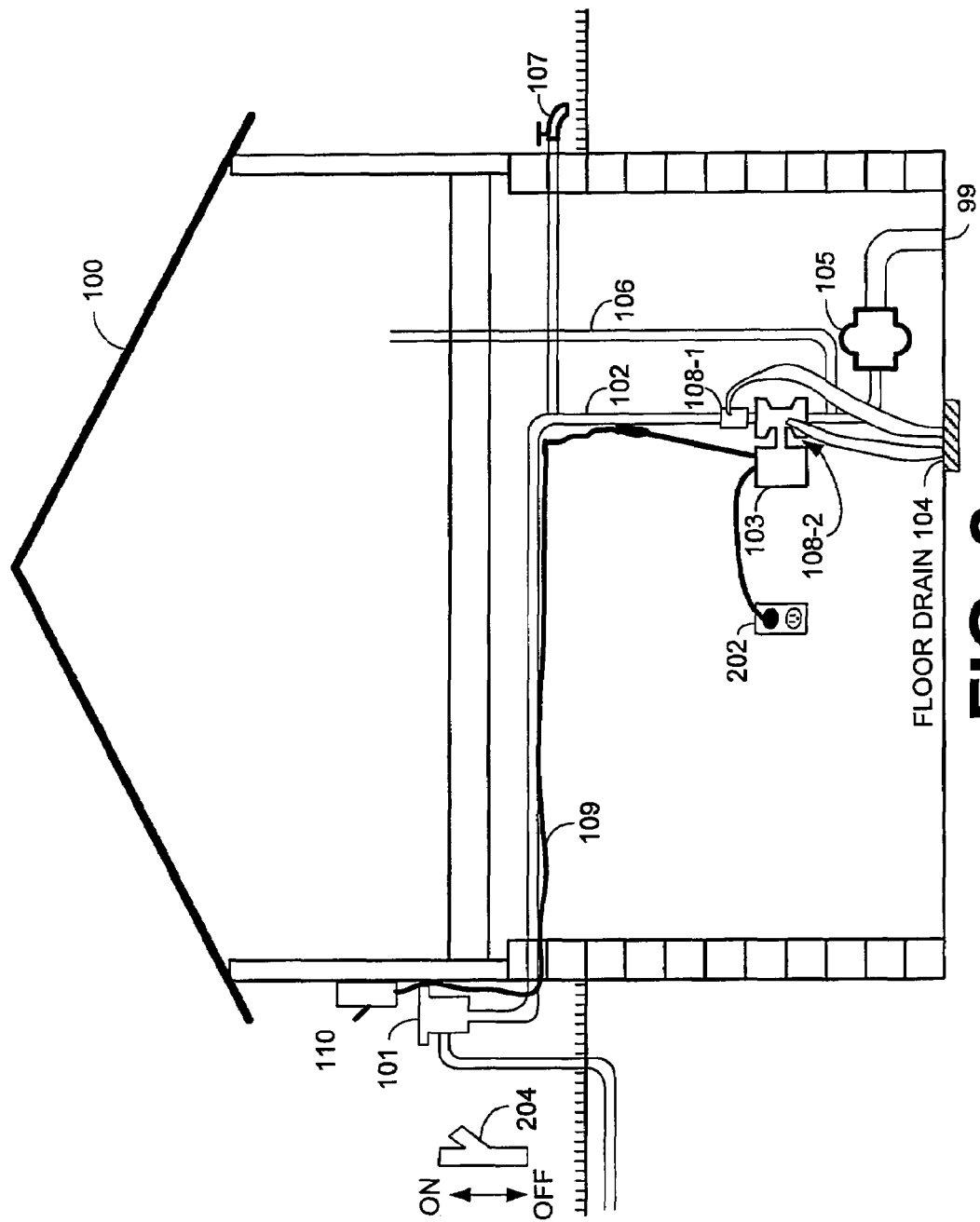
FIG. 2 shows a schematic diagram according to an embodiment of the present subject matter.

FIG. 2 shows another embodiment according to the present subject matter. The means for controlling 110 in this embodiment is a switch 204. Such a switch 204 in various embodiments, is a switch having at least a same number of positions as the electrically controlled valve 103 has. For example, if the electrically controlled valve has two positions, the switch 204 has at least two positions.

As further illustrated in FIG. 2, this embodiment includes a power source 202 for powering the electrically controlled valve 103. As illustrated, this power source 202 is a conventional 120V AC outlet. However, other embodiments include the power source 202 being a DC power source such as a battery. The type of power source of a certain embodiment alters various properties the electrically operable valve 103 must have for handling power, such as a need for a transformer (not shown) for transforming AC to DC.

Figure 3:
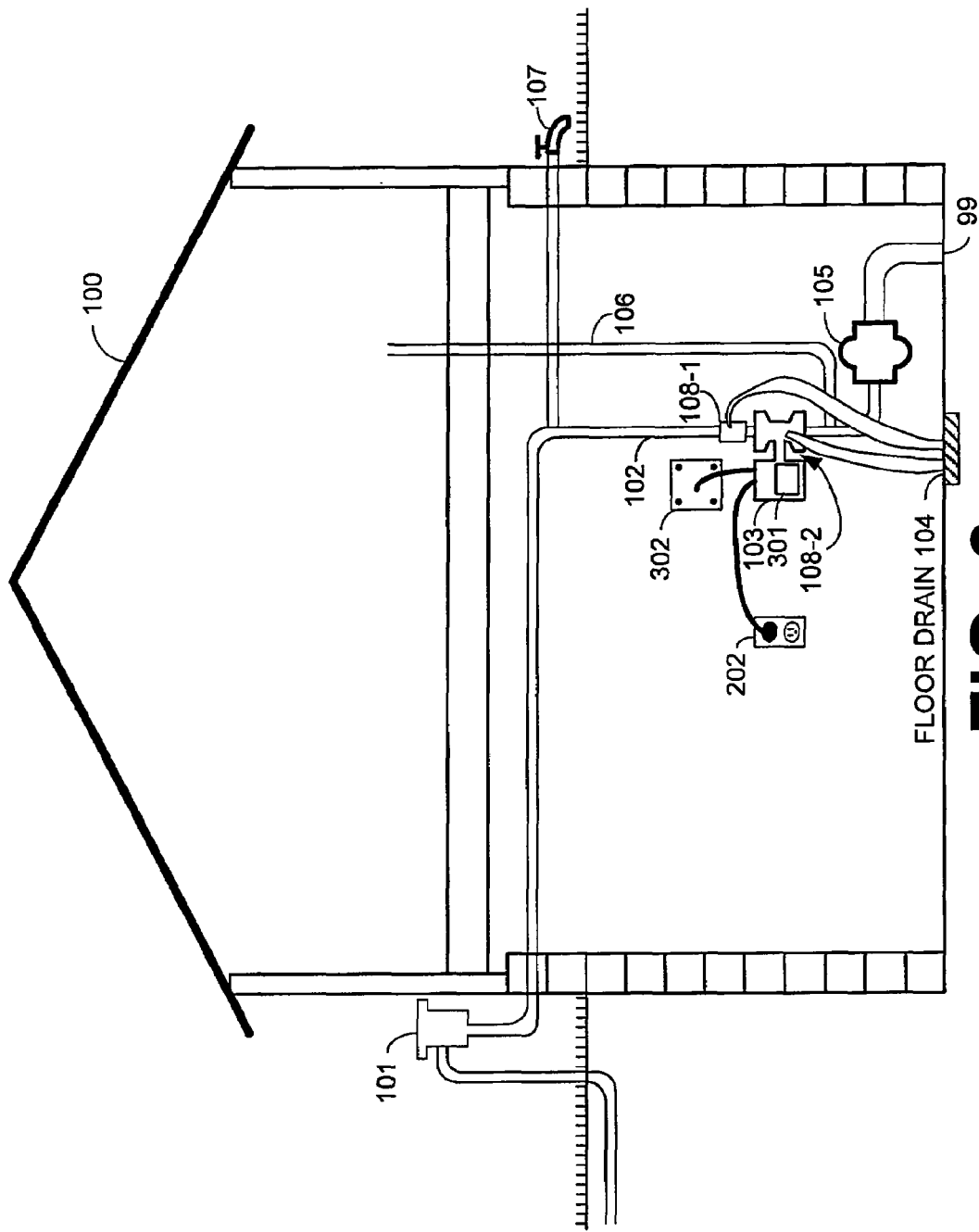
FIG. 3 shows a schematic diagram according to an embodiment of the present subject matter.

FIG. 3 illustrates yet another embodiment of the present subject matter. The embodiment illustrated in FIG. 3 includes a valve controller unit 301 capable of receiving and responding to commands received from a remote location. In some such embodiments, the valve controller unit 301 includes a modem coupled to a phone jack 302 in the structure 100. In other embodiments, the modem includes a wireless communication device. In some embodiments, the wireless communication device is enabled with mobile phone technology. In further, embodiments, the controller unit 301 receives commands over an antenna (not shown) embodied in a carrier wave broadcast as a radio signal. In yet further embodiments, the controller unit 301 connects to the Internet.

The commands the valve controller unit 301 receives can originate from various sources. Such sources include irrigation system 101 maintenance personnel, but also government entities or others charged with enforcing watering restrictions. Such embodiments as illustrated in FIG. 3 are well suited for remote enforcement of watering and water user restrictions. The governing entity can send a signal to the valve controller unit 301 disabling and enabling water use external to the structure. In some embodiments that utilize telephone technology for communication, the valve controller unit 301 calls into a central server operated by the governing entity to receive any available commands regarding external water use. Such commands include commands for enabling and disabling external water use, allowing water use only on certain days such as odd or even numbered days, or allowing only a certain amount of water usage external to the structure 100 as determined by the valve controller unit 301. Some embodiments of the valve controller unit 301 monitor amount of water usage through communication with the water meter 105, while other embodiments monitor water usage amounts on a calculation made by the valve controller unit 301 based on reading from one or more sensors coupled to the valve controller unit 301. Some further embodiments include the controller unit 301 receiving commands from the Internet.

Figure 4:
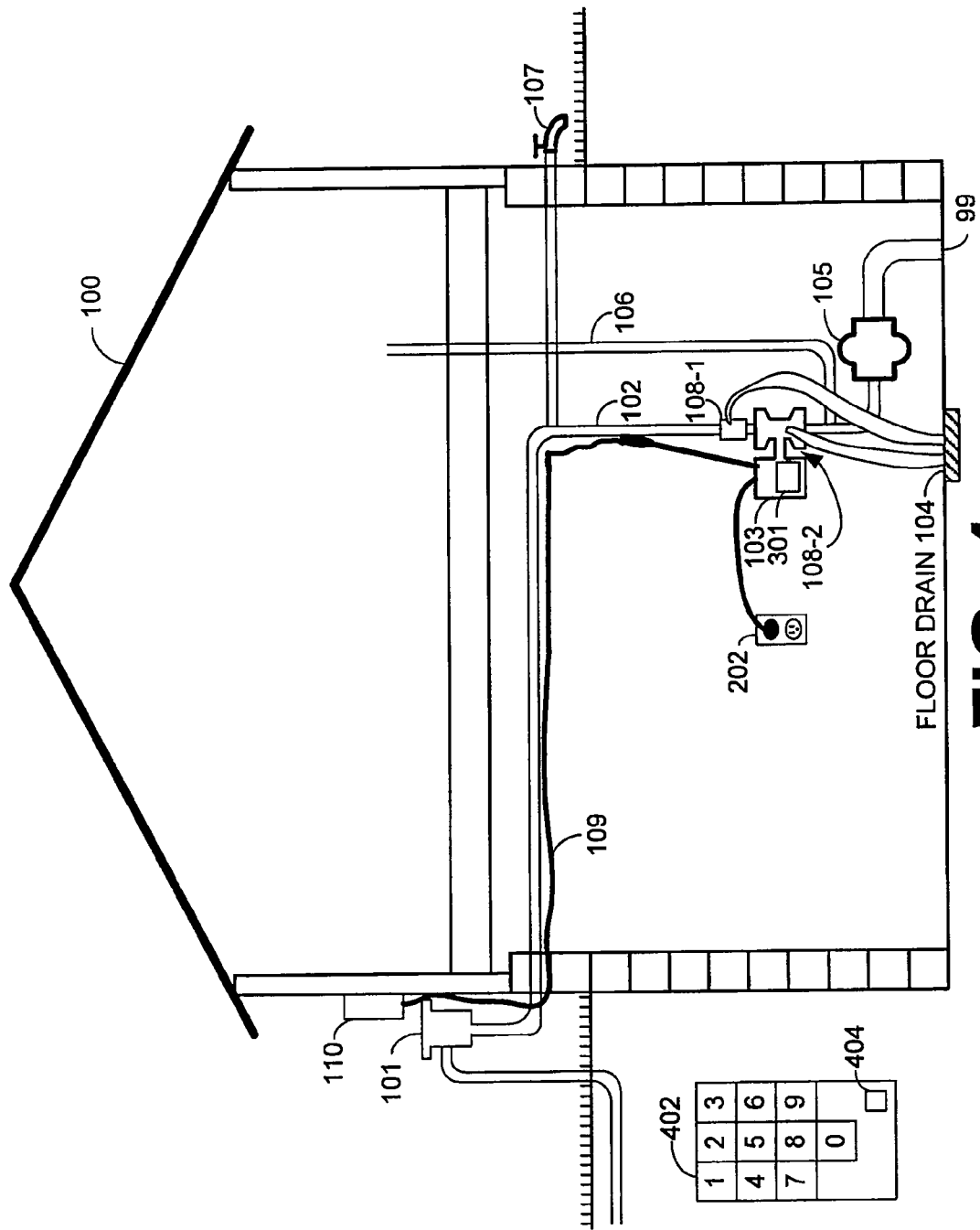
FIG. 4 shows a schematic diagram according to an embodiment of the present subject matter.

FIG. 4 illustrates another embodiment of the present subject matter. This embodiment includes a key pad 402 on the means for controlling 110 the electrically operable valve 103. The key pad 402 includes an input controller unit 404 for receiving an input code from the key pad 402 for comparison against a stored code. If the input code matches the stored code, the input controller unit 404 sends a signal over the wire 109 to the electrically operable valve to open or close depending on the current position of the valve 103. In other embodiments, the key pad 402 includes a selector button for specifying the valve 103 position desired upon entry of a matching code.

Figure 5:
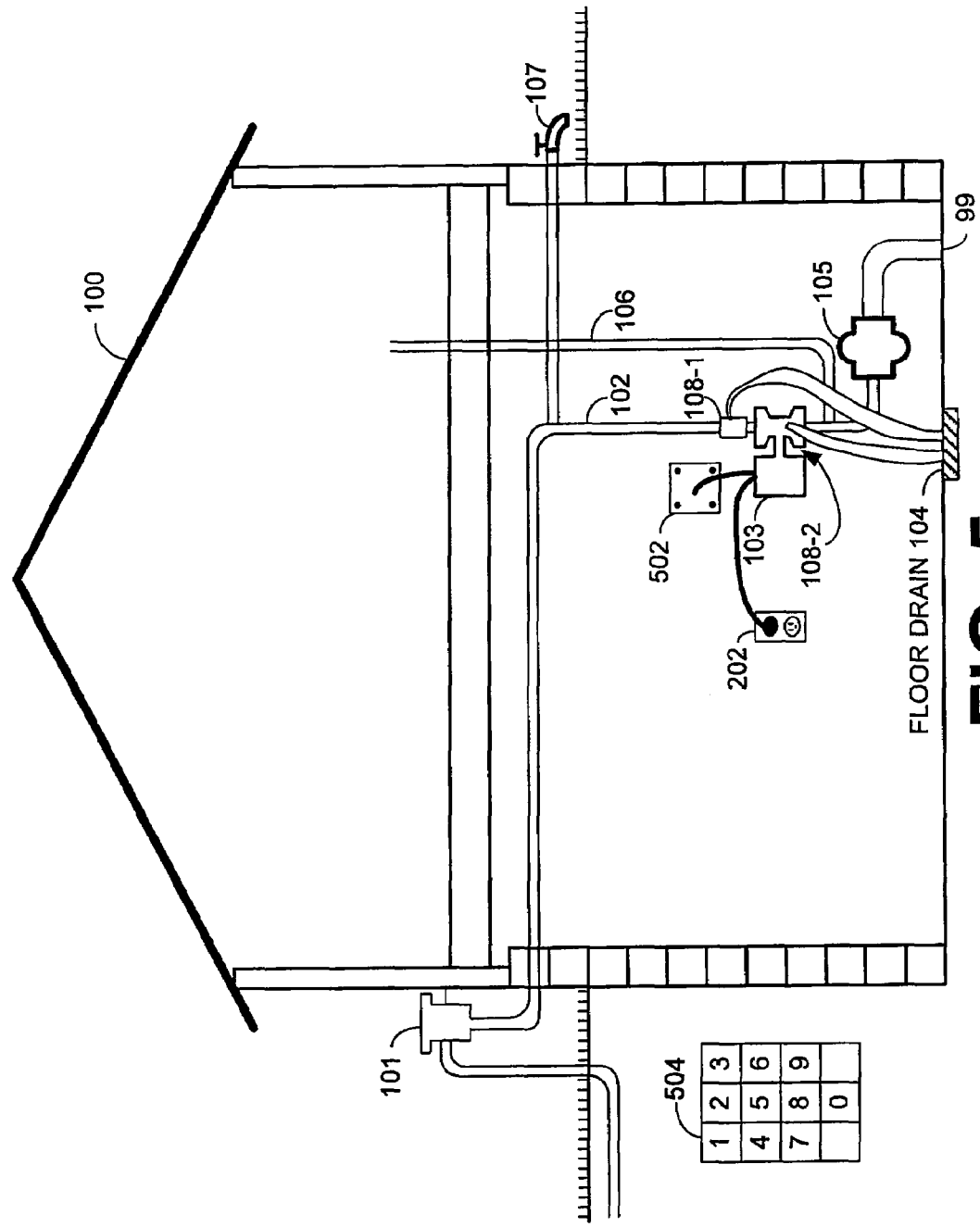
FIG. 5 shows a schematic diagram according to an embodiment of the present subject matter.

FIG. 5 is another embodiment of the present subject matter. This embodiment includes a wireless communication receiver 502 and a wireless communication device 504. In various embodiments, the wireless communication device 504 is a mobile telephone, a handheld wireless computing device, a radio frequency controller similar to a garage door opener controller, or any other similar device capable of generating a signal to the wireless communication receiver 502.

Figure 6:
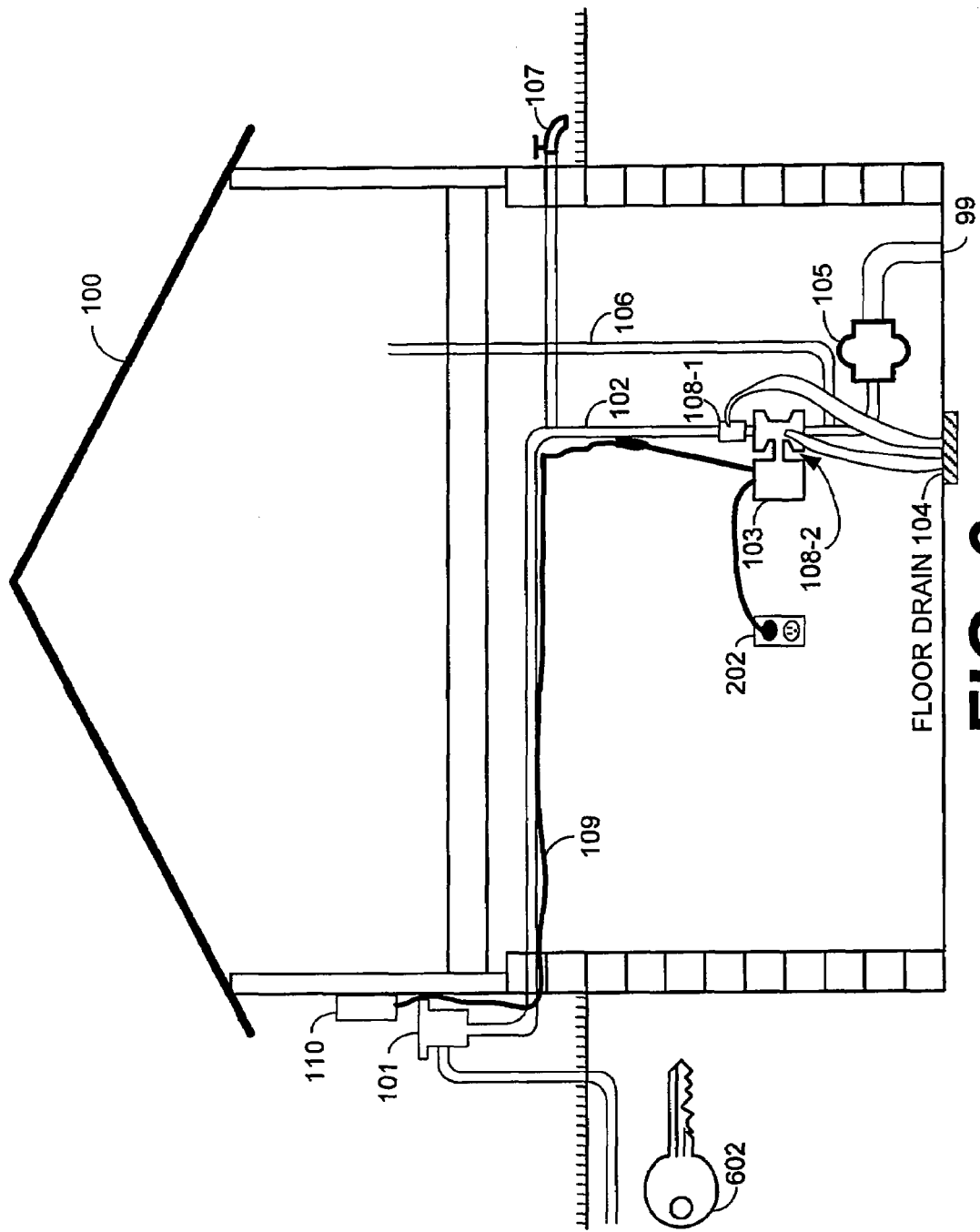
FIG. 6 shows a schematic diagram according to an embodiment of the present subject matter.

Another embodiment is shown in FIG. 6. This embodiment includes the means for controlling 110 having a lock switch, the activation of which activates and deactivate the electrically controlled valve 103 to open and close the electrically controlled valve 103. The lock switch, in various embodiments, can be activated using only a key 602.

Figure 7C:
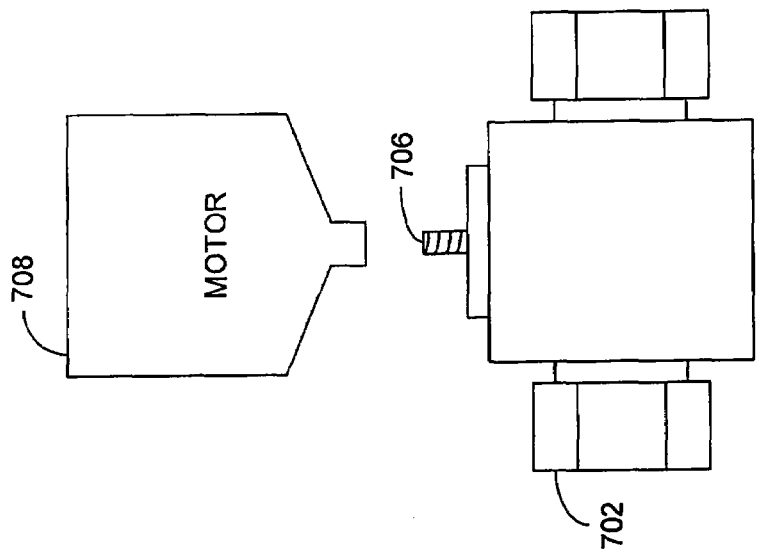
FIG. 7C shows a diagram according to an embodiment of the present subject matter.
Figure 7A:
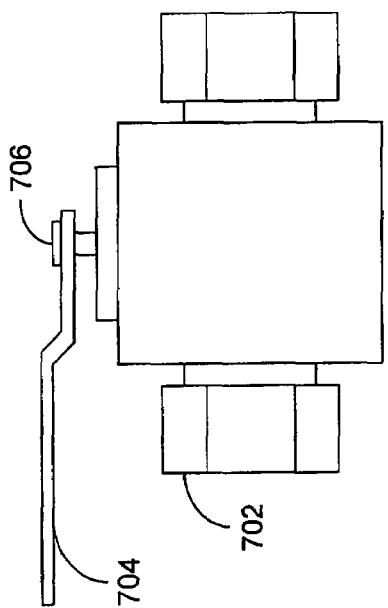
FIG. 7A shows a diagram according to an embodiment of the present subject matter.

FIG. 7A shows a ball valve 702. The ball valve 702 has a handle 704 for opening and closing the ball valve 702. The handle 704 connects to the ball valve 702 at a bolting point 706. When the bolting point 706 is rotated laterally, the ball inside the valve 702 moves from the open to closed position or from the closed to open position.

Figure 7B:
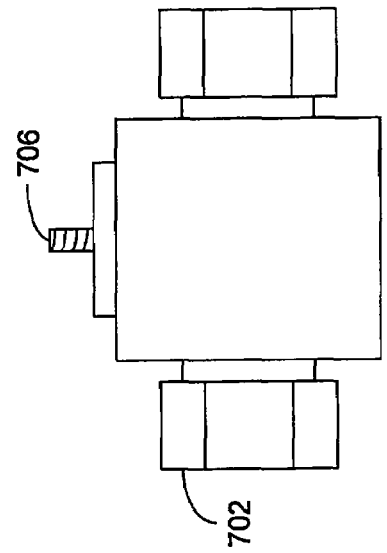
FIG. 7B shows a diagram according to an embodiment of the present subject matter.

FIG. 7B shows the ball valve 702 with the handle 704 removed from the bolting point 706. By removing the handle 704 from the bolting point 706, the bolting point 706 is capable of receiving an electric motor 708 (as shown in FIG. 7C). By attaching the motor to the ball valve 704, the ball valve becomes an electrically operable valve 103 as described above with reference to FIG. 1. This allows for retrofitting an external water supply of a structure with the subject matter described herein without requiring the replacement of the ball valve 103 illustrated in FIG. 1. In many cases, no further plumbing is necessary for installation, thus making installation on existing structures more feasible.

Figure 8:
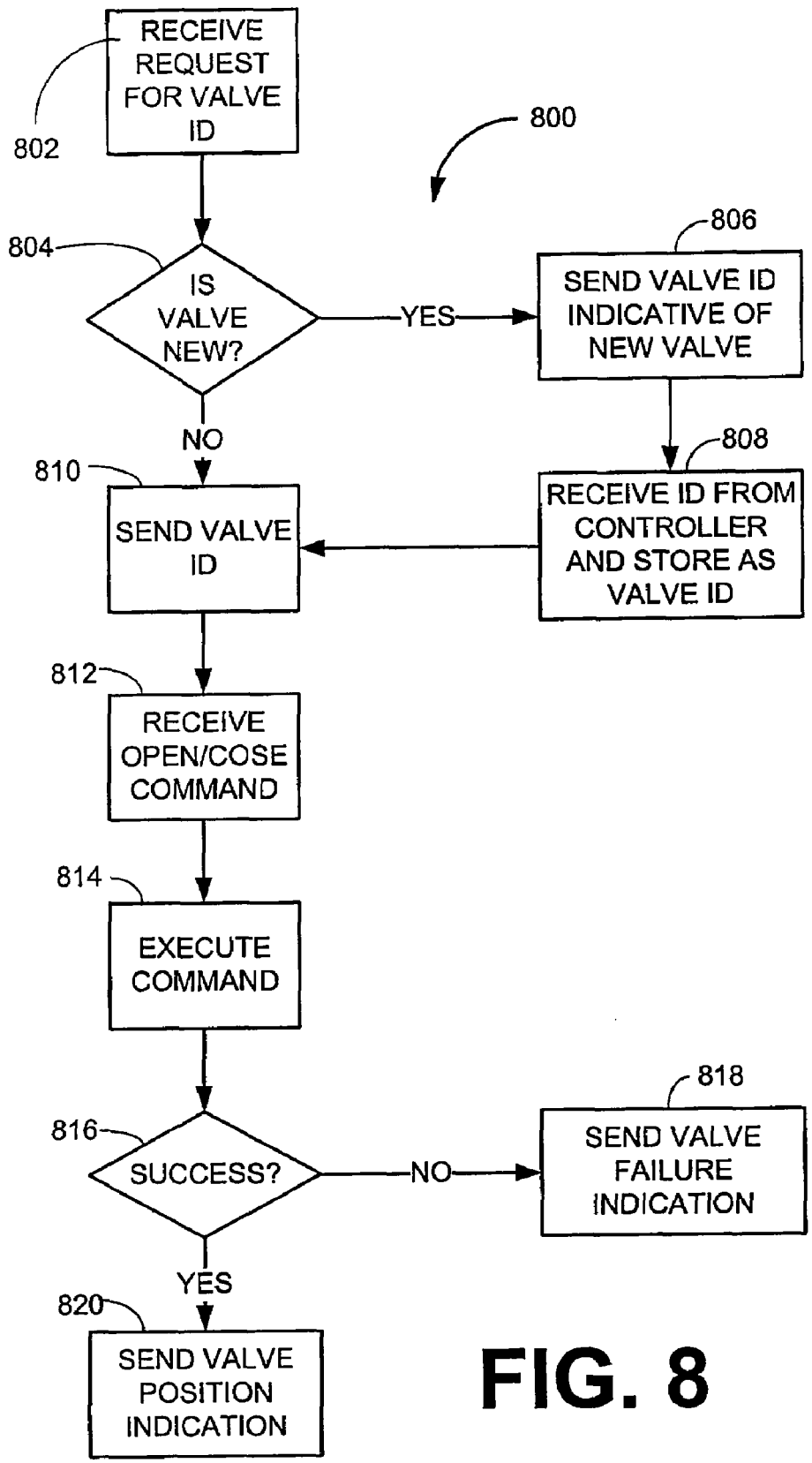
FIG. 8 shows a block diagram of a method according to an embodiment of the present subject matter.

FIG. 8 shows a method 800 according to an embodiment of the present subject matter. The method 800 is operable to remotely control a valve, such a controlling a valve inside a building from the exterior of the building. The method 800 includes receiving a request for a valve ID 802 and determining if the valve is new 804. If the valve is new, or newly installed, the valve ID is set to a default ID such as "00000000" when the valve ID is an 8-bit ID.

If the result of the determination 804 is that the valve is new, the method sends the valve ID indicative of a new valve 806 to the requestor and receives an ID from the requester, such as a remote control, and stores the received ID as the valve ID 808. If the result of the determination 804 is that the valve is not new, or newly installed, or if the valve is new, or newly installed, and the valve ID has been stored 808, the method 800 then sends the valve ID 810 to the requestor.

The method 800 then continues by receiving an open or close command 812 to open or close the valve and then executing the command 814. The method 800 then determines 816 if the command has been properly executed. If the command has not been properly executed, a valve failure indication is sent 818 to the requester. If the command was properly executed, a valve position indication is sent to the requestor 820.

Figure 9:
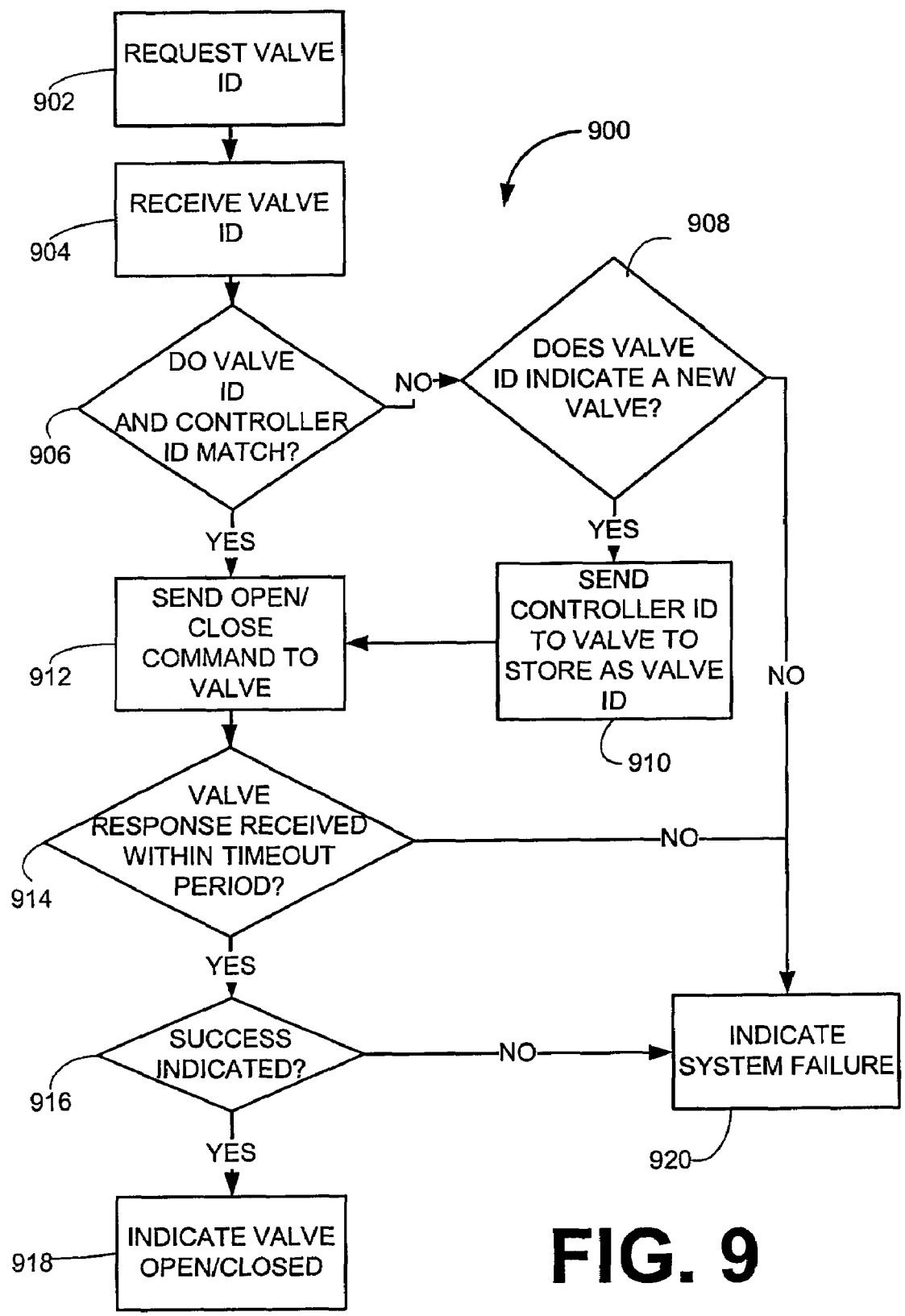
FIG. 9 shows a block diagram of a method according to an embodiment of the present subject matter.

FIG. 9 shows a method 900 according to an embodiment of the present subject matter. The method 900 is operable on a controller, such as a handheld, portable remote control of a valve that is internal to a building. The method 900 operates to interface with a valve controller on such a valve internal to building that operates according to another method, such as method 800 illustrated and discussed above with reference to FIG. 8.

The method 900 includes requesting 902 and receiving 904 a valve ID from a remote valve. The method 900 then determines 906 if the valve ID matches a controller ID. If there is not a match, the method 900 determines 908 if the valve ID indicates that the valve is new or newly installed. If there is not a match and the valve ID indicates the valve is neither new nor newly installed, the method 900 provides an indication of system failure 920. If there is not a match, but the valve ID indicates the valve is new or newly installed, the method 900 sends the controller ID to the valve to store as the valve ID. In this case and when the valve ID and controller ID match, the method 900 continues by sending an open or close command to the valve 912.

After the open or close command is sent to the controller, the method 900 determines 914 if a response from the valve is received within a timeout period. If a response is not received from the valve, the method indicates a system failure 920. However, if a response is received from the valve within the timeout period, the method 900 determines 916 if successful valve operation is indicated in the response from the valve. If success is indicated, the method indicates that the valve is in the open or close position 918 according to the command sent to the valve. If the method determines 916 that success is not indicated in the response from the valve, the method indicates a system failure 920.

Figure 10:
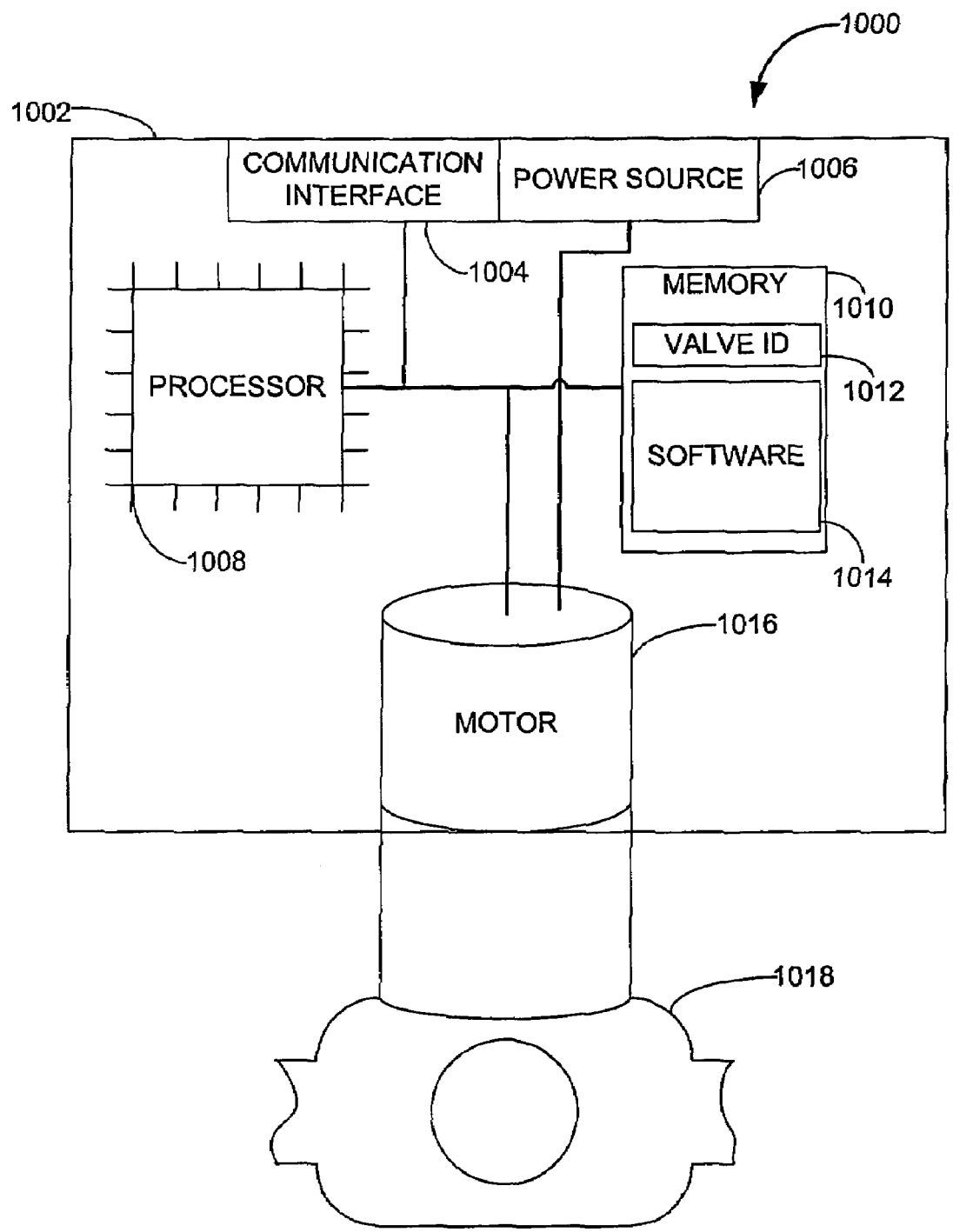
FIG. 10 shows a block diagram of an apparatus according to an embodiment of the present subject matter.
Figure 11:
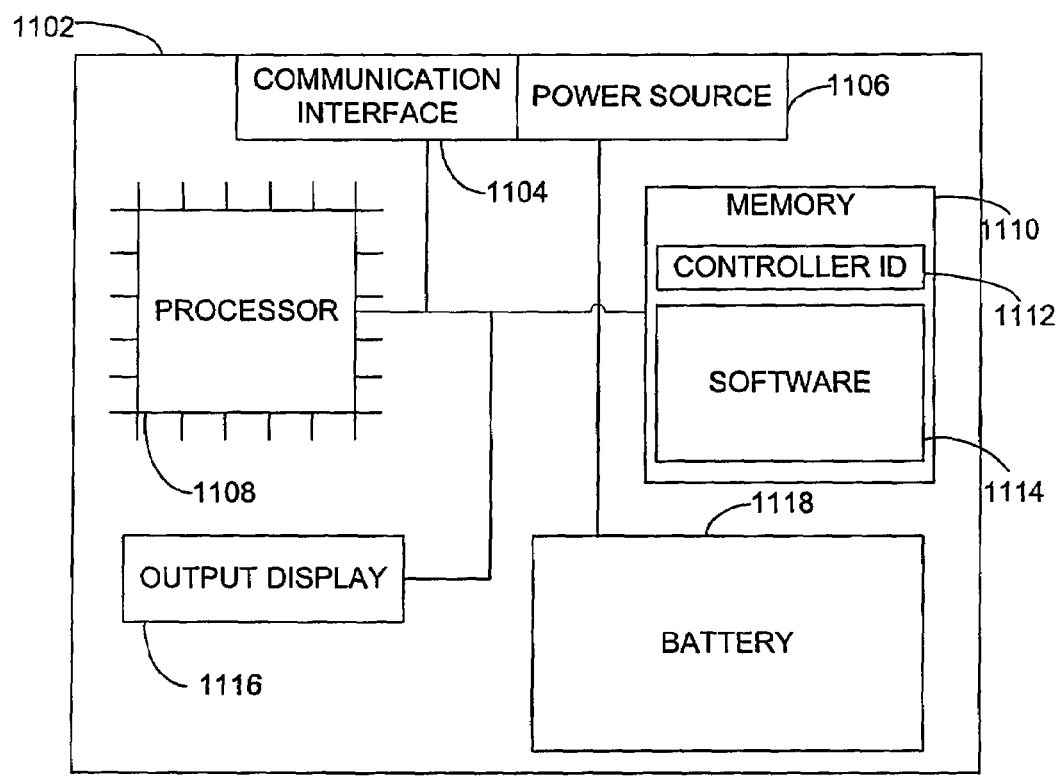
FIG. 11 shows a block diagram of an apparatus according to an embodiment of the present subject matter.

FIG. 10 shows an apparatus 1000 according to an embodiment of the present subject matter. The apparatus 1000 includes a valve manipulation apparatus 1002 coupled to a valve 1018. The valve manipulation apparatus 1002 operates to manipulate the valve 1018 according to commands received from a remotely operable valve controller, such as is illustrated in FIG. 11.

Returning to FIG. 10, the valve manipulation apparatus 1002 includes a communication interface 104, a power source 1006, a processor 1008, a memory 1010, and a motor 1016.

The communication interface 1004 is operable to send and receive data. In some embodiments, the communication interface 1004 is a universal asynchronous receiver-transmitter ("UART"). In various embodiments, the communication interface 1004 is a wired or wireless device.

The power source 1006, in some embodiments, is an electric power receiving port that receives electric power and distributes that power for the operation of the various components of the valve manipulation apparatus. In other embodiments, the power source 1006 is a battery. In yet other embodiments, the power source 1006 is an AC to DC transformer to convert received alternating current to direct current.

In some embodiments, the processor 1008 represents a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), an erasable programmable read-only memory ("EPROM") microprocessor, an electrically erasable programmable read-only memory ("EEPROM") microprocessor or hybrid architecture, although any appropriate processor may be used. In some embodiments, the processor 1008 represents a CMOS flash microcontroller with built in readable/writeable EEPROM data storage. In some such embodiments, the processor is a 14-pin flash-based 8-bit CMOS microcontroller, such as model PIC16F630/676 available from Microchip Technology, Inc. of Chandler, Ariz. The processor 1008 executes instructions, such as instruction encoded in software 1014 that are stored in the memory 1010.

In some embodiments, the memory 1010 represents a memory of any type of architecture, such as a programmable read-only memory ("PROM"), an EPROM, an EEPROM, a random access memory, and a hard disk. Various embodiments include volatile and non-volatile memories and storage devices. In some embodiments, the processor 1008 and memory 1010 are both within an integrated device such as an EEPROM microprocessor. In some embodiments, the memory 1010 is included with the processor 1008 in a CMOS flash microcontroller with built in readable/writeable EEPROM data storage such as a 14-pin flash-based 8-bit CMOS microcontroller. An example of such as device is model PIC16F630/676 available from Microchip Technology, Inc. of Chandler, Ariz.

In some embodiments, the memory 1010 of the valve manipulation apparatus 1002 includes a valve ID and software 1014. The valve ID 1012 is an identifier of the valve manipulation apparatus 1002. It is used to validate the right of a remotely operable valve controller to operate a valve coupled to the valve manipulation apparatus 1002.

The software 1014 is operable on the processor 1008 to cause the valve manipulation apparatus 1002 to receive and respond to a request for a the valve ID 1012 over the communication interface 1006, receive a command to manipulate the valve by operating the electric motor 1016, the command received over the communication interface 1004, and operate the electric motor 1016 according to the received command.

In some other embodiments, the software 1014 is operable on the processor 1008 to receive a controller ID from a remotely operable valve controller over the communication interface 1004 and verify that the remotely operable valve controller has rights to issue commands to the valve manipulation apparatus 1002. The valve manipulation apparatus 1002, in some embodiments, verifies the rights of the remotely operable valve controller by matching the controller ID with the valve ID. If there is a match, the remotely operable valve controller has sufficient rights and the valve manipulation apparatus 1002 will then respond to commands received from the remotely operable valve controller.

FIG. 11 shows an apparatus 1102 according to an embodiment of the present subject matter. The apparatus 1102 is an example embodiment of a remotely operable valve controller that communicates with valve manipulation devices such as valve manipulation apparatus 1002 illustrated and described above with reference to FIG. 10. The apparatus 1102 includes a communication interface 1104, a power source 1106, a processor 1108, a memory 1110, and an output display 1116. As illustrated, the apparatus also includes an optional battery 1118.

In some embodiments, the apparatus 1102 is powered by the battery 1118 and also supplies power to a valve manipulation device when coupled via the power source 1106. In some embodiments that include a battery 1118, the apparatus includes a battery space to hold the battery 1118. In other embodiments, the apparatus does not have the optional battery 1118 and instead receives power to power the apparatus 1102 from the power source 1106.

The communication interface 1104 is operable to send and receive data. In some embodiments, the communication interface 1104 is a universal asynchronous receiver-transmitter ("UART"). In various embodiments, the communication interface 1004 is a wired or wireless device to facilitate communication with other devices such as a valve manipulation apparatus.

In some embodiments, the processor 1108 represents a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), an erasable programmable read-only memory ("EPROM") microprocessor, an electrically erasable programmable read-only memory ("EEPROM") microprocessor, or hybrid architecture, although any appropriate processor may be used. In some such embodiments, the processor 1108 is a 14-pin flash-based 8-bit CMOS microcontroller, such as model PIC16F630/676 available from Microchip Technology, Inc. of Chandler, Ariz. The processor 1108 executes instructions, such as instruction encoded in software 1014 that are stored in the memory 1110. The processor 1108 executes instructions, such as instruction encoded in software 1114 that are stored in the memory 1110.

In some embodiments, the memory 1110 represents a memory of any type of architecture, such as a programmable read-only memory ("PROM"), an EPROM, an EEPROM, a random access memory, and a hard disk. Various embodiments include volatile and non-volatile memories and storage devices. In some embodiments, the processor 1108 and memory 1110 are both within an integrated device such as an EEPROM microprocessor. In some embodiments, the memory 1110 is included with the processor 1108 in a CMOS flash microcontroller with built in readable/writeable EEPROM data storage such as a 14-pin flash-based 8-bit CMOS microcontroller. An example of such as device is model PIC16F630/676 available from Microchip Technology, Inc. of Chandler, Ariz.

In some embodiments, the memory 1110 of the apparatus 1102 includes a controller ID and software 1114. The controller ID 1112 is an identifier of the apparatus 1102. The controller ID 1012 is used to validate the rights of apparatus 1102 to operate a valve coupled to a valve manipulation apparatus. In other embodiments, the apparatus includes a bank of DIP switches to set the controller ID.

The software 1114 is operable on the processor 1108 to cause the apparatus 1002 request and receive a valve ID over the communication interface 1104, compare the received valve ID to the controller ID 1112, and if the valve ID and the controller ID 1112 match, send a signal with an encoded command over the communication interface to manipulate a valve motor. The command can include a command to open or close a valve coupled to the valve motor. In some embodiments, the software 1114 is further operable on the processor 1108 to process a status signal received from a valve manipulation apparatus over the communication interface 1104 and cause the output display 1116 to display a representation of the remote valve status. This valve status, in various embodiments, includes a valve open status, a valve closed status, and a malfunction status.

The output display 1116, in some embodiments, includes a set of one or more light emitting diodes ("LEDs"). Each of the one or more LEDs include a label. When an LED is illuminated, the LED is indicative of what the label represents. Other embodiments include color and monochromatic liquid crystal displays, cathode ray tube displays, and virtually any other display type capable of communicating information and data visually to a user. An example of an output display 1116 is illustrated and described with reference to FIG. 12.

Figure 12:
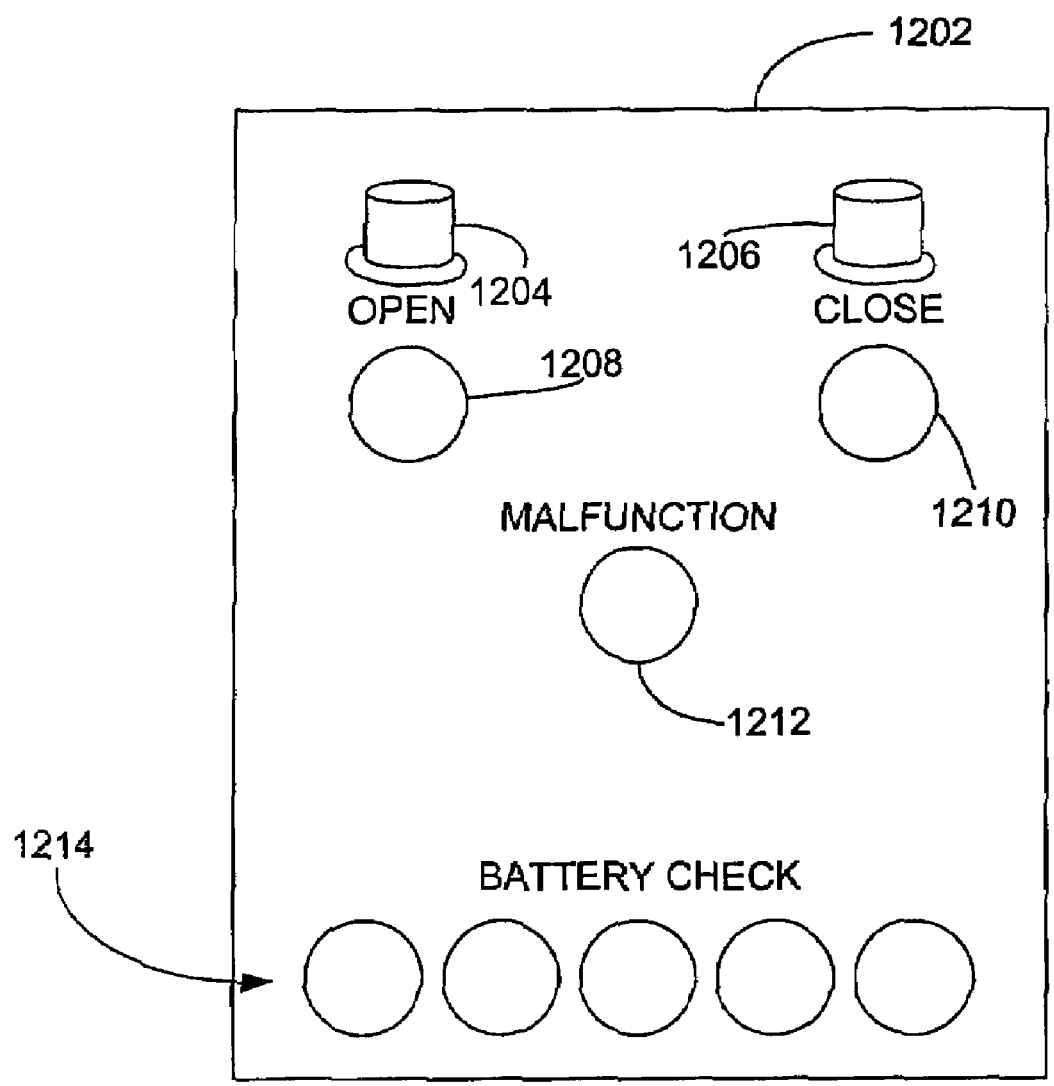
FIG. 12 shows a block diagram of an apparatus according to an embodiment of the present subject matter.

FIG. 12 shows a user interface 1202 according to an embodiment of the present subject matter. The user interface 1202 is a user interface of a remotely operable valve controller as illustrated and described with reference to the apparatus 1102 of FIG. 11.

In some embodiments, the user interface 1202 includes input mechanisms such an open button 1204 and a close button 1206. When pressed, the open button 1204 and the close button 1206 cause a remotely operable valve controller to operate to cause a signal to be sent to a remote valve to open or close, respectively. The user interface further includes status indicators such as a valve open indicator LED 1208, a valve closed indicator LED 1210, and a valve malfunction indicator LED 1212. Some embodiments of the user interface 1202 further include a battery check indicator set of LEDs 1214 that indicate a charge level remaining in a battery.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

We claim:

1. An apparatus to control water flow to an irrigation system, the apparatus comprising:
   a landscape irrigation system external to a structure;
   an electrically operable valve placed on a water supply line internal to the structure between a location where the water supply line enters the structure and a location where the water supply line exits the structure to supply water to the landscape irrigation system; and
   a conductive connection extending from the electrically operable valve internal to the structure to a location external to the structure, the conductive connection to carry a signal the electrically operable valve internal to the structure to cause the electrically operable valve to open or close in response to the signal; and
   an auto-drain valve coupled to the water supply line internal to the structure, the auto-drain valve operable to drain water from the water supply line upon closing of the electrically operable valve.

2. The apparatus of claim 1, wherein the auto-drain valve is a pressure biased auto-drain valve.

3. The apparatus of claim 1, further comprising:
   a drain line, wherein the drain line is coupled to the auto-drain valve and extends to a drain.

4. The apparatus of claim 1, wherein the conductive connection is capable of receiving and carrying electricity from a controller to operate the electrically operable valve from the location external to the structure.

5. The apparatus of claim 1, wherein the conductive connection is capable of receiving and carrying control signals to the electrically operable valve.

6. The apparatus of claim 1, wherein the electrically operable valve is a valve having an electric motor attached thereto to open and close the valve.

* * * * *